(12) United States Patent
Kim

(10) Patent No.: US 8,384,926 B2
(45) Date of Patent: Feb. 26, 2013

(54) METHOD FOR DISPLAYING STATE OF PROCESSING DATA

(75) Inventor: Yang-moon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1155 days.

(21) Appl. No.: 11/239,358

(22) Filed: Sep. 30, 2005

(65) Prior Publication Data

US 2006/0072154 A1 Apr. 6, 2006

(30) Foreign Application Priority Data

Oct. 1, 2004 (KR) .................. 10-2004-0078482

(51) Int. Cl.
| | |
|---|---|
| H04N 1/00 | (2006.01) |
| H04N 1/40 | (2006.01) |
| H04N 1/04 | (2006.01) |
| G06F 3/12 | (2006.01) |
| G06K 15/00 | (2006.01) |

(52) U.S. Cl. ....... 358/1.15; 358/1.6; 358/1.13; 358/444; 358/474; 358/1.14

(58) Field of Classification Search .................. 358/404, 358/434, 1.15; 710/100
See application file for complete search history.

(56) References Cited

U.S. PATENT DOCUMENTS

| | | | | | |
|---|---|---|---|---|---|
| 5,911,044 | A | * | 6/1999 | Lo et al. | 709/203 |
| 5,930,003 | A | * | 7/1999 | Kondo | 358/404 |
| 6,486,968 | B2 | * | 11/2002 | Nishikawa | 358/1.15 |
| 6,819,444 | B1 | * | 11/2004 | Yamagishi | 358/1.15 |
| 6,934,042 | B1 | * | 8/2005 | Morita et al. | 358/1.15 |
| 6,961,144 | B2 | * | 11/2005 | Usami | 358/1.15 |
| 7,027,641 | B2 | * | 4/2006 | Ide et al. | 382/154 |
| 7,113,490 | B2 | * | 9/2006 | Ikeda | 370/278 |
| 7,363,855 | B2 | * | 4/2008 | Esaki et al. | 101/129 |
| 2001/0025326 | A1 | * | 9/2001 | Kizaki | 710/100 |
| 2003/0048765 | A1 | | 3/2003 | Jang | |
| 2003/0214679 | A1 | * | 11/2003 | Ishikawa | 358/434 |
| 2004/0160634 | A1 | * | 8/2004 | Watanabe | 358/1.15 |
| 2004/0174561 | A1 | * | 9/2004 | Fukunaga et al. | 358/1.15 |

FOREIGN PATENT DOCUMENTS

| | | |
|---|---|---|
| JP | 06-209929 | 8/1994 |
| JP | 2000-32200 | 1/2000 |
| JP | 2000-032200 | 1/2000 |
| JP | 2000-227863 | 8/2000 |
| JP | 2000-276379 | 10/2000 |
| KR | 20-1994-020411 | 9/1994 |
| KR | 10-2001-0036629 | 5/2001 |
| KR | 20030014998 | 2/2003 |

* cited by examiner

*Primary Examiner* — Akwasi M Sarpong
(74) *Attorney, Agent, or Firm* — Roylance, Abrams, Berdo & Goodman, LLP

(57) ABSTRACT

A method for displaying a progress state of processing data and a host computer for implementing the method is provided. Further, a method for displaying a plurality of progress states of processing data and a host computer for implementing the method is provided. According to the method, at least more than a signal representing a plurality of progress states of processing data are generated, and a plurality of progress states of processing data are respectively displayed according to the generated signals. The method displays a progress state of the image data reception and a progress state of processing the image data by using a plurality of progress bars, respectively, so that a user may easily check the progress state of the reception of the image data and the progress state of the image process of the image data.

10 Claims, 4 Drawing Sheets

(a)

| PROGRESS STATE OF DATA RECEPTION | 100% |
| PROGRESS STATE OF PROCESSING DATA | 70% |

(b)

PROGRESS STATE OF DATA RECEPTION
                                            COMPLETED

PROGRESS STATE OF PROCESSING DATA
                                    3.12 SEC/21.54 SEC (c)

PROGRESS STATE OF DATA RECEPTION
100%
PROGRESS STATE OF PROCESSING DATA
41%

METHOD FOR DISPLAYING STATE OF PROCESSING DATA

CROSS-REFERENCE TO RELATED APPLICATIONS

This application claims the benefit under 35 U.S.C §119(a) of Korean Patent Application No. 10-2004-0078482, entitled "METHOD FOR DISPLAYING STATE OF PROCESSING DATA" filed on Oct. 1, 2004, in the Korean Intellectual Property Office, the entire disclosure of which is hereby incorporated by reference.

BACKGROUND OF THE INVENTION

1. Field of the Invention

The present invention relates to a method for displaying a progress state of data processing and a host computer for implementing the method. More particularly, the present invention relates to a method for displaying a plurality of progress states of data processing and a host computer for implementing the method.

2. Description of the Related Art

FIG. 1 is a flowchart illustrating a conventional method for processing data provided by a data supplying apparatus in a predetermined manner. The data supplying apparatus indicates an apparatus such as a scanner, a digital camera or a multifunction machine, for obtaining data of a predetermined image and supplying the same. Although the present invention is not so limited by way of an example, the data supplying apparatus is described as a scanner for better understanding of the present invention.

A predetermined image is prescanned by a scanner (not shown) with a low resolution and displayed on a display unit at step 110. A user inputs user instructions for selecting a region to scan in the displayed image with a low resolution and for selecting an image processing method for processing the selected image region through a user interface at step 120. The scanner (not shown) rescans the image with a high resolution pursuant to the user instructions and a data processor (not shown) receives the scanned image from the scanner at step 130. The received image is image-processed at the data processor according to the selected image data processing method at step 140.

FIG. 2 is a diagram illustrating a conventional progress bar for representing a progress state of data processing in the method for processing data illustrated in FIG. 1. As illustrated in FIG. 2, a progress state of data processing in the scanning is displayed by using one progress bar. As described above, a conventional scanning comprises the steps of receiving image data obtained by the scanner at the data processor, and processing the received image data by using a predetermined image data processing method. However, the conventional progress bar displays only a progress state of image data reception which represents how much the image data is received, not displaying a progress state of image data processing which represents how much the image data is processed with the predetermined image processing method.

Even reception of the image data is completed, an additional time is needed to process the received image data with the predetermined image processing method. Since a user typically is not aware of a progress state of the image processing when it takes about several minutes or more than ten minutes to process the image data, there is a possibility that the data processor may be assumed as not being working even though the data processor is properly processing the image data. In addition, even if a user may recognize that the data processor is still processing the image data constantly, there is some inconvenience that a user may not be aware of a remaining time for completion of the image data processing.

SUMMARY OF THE INVENTION

The present invention is to provide a method for displaying at least a plurality of progress states of data processing, respectively.

According to an aspect of the present invention, a host computer for respectively displaying a plurality of progress states of processing data received from a data supplying apparatus is provided.

According to another aspect of the present invention, a system comprising a data supplying apparatus and a host computer is provided. The system displays a plurality of progress states of processing data received from the data supplying apparatus through the host computer.

According to further another aspect of the present invention, a method for displaying a progress state of data processing is provided. The method comprises the steps of generating a signal for representing a subdivided progress state of processing data transmitted from a data supplying apparatus, and displaying the subdivided progress state of data process according to the generated signal. The data supplying apparatus may be, for example, a scanner. The generating of the signal comprises the steps of generating a first signal for indicating a state of scanning an image and transmitting the scanned image data, and generating a second signal for representing a progress state of processing the scanned image data.

According to yet another aspect of the present invention, a host computer is provided. The computer comprises a signal generator for generating a signal representing a subdivided progress state of processing data transmitted from the data supplying apparatus, a data processor for processing the transmitted image data by using a predetermined image data processing method, and a display unit for displaying the subdivided progress state of processing data according to the generated signal.

The data supplying apparatus may be, for example, a scanner. The signal generator comprises a first signal generator for generating a first signal for indicating a state of scanning an image and transmitting the scanned image data, and a second signal generator for generating a second signal for representing a progress state of processing the scanned image data.

The system to achieve the above-mentioned objects comprises a data supplying apparatus for supplying predetermined data to a host computer, and a host computer for receiving data from the data supplying apparatus to process the data by using a predetermined data processing method, and displaying a progress state of receiving the data and a progress state of processing the data, respectively.

BRIEF DESCRIPTION OF THE DRAWINGS

The above and other features and advantages of the present invention will become more apparent by describing in detail exemplary embodiments thereof with reference to the accompanying drawings in which.

Throughout the drawings, like reference numerals will be understood to refer to like parts, components and structures.

DETAILED DESCRIPTION OF EXEMPLARY EMBODIMENTS

The present invention will now be described in greater detail with reference to the accompanying drawings, in which exemplary embodiments of the invention are shown.

Figure 1:
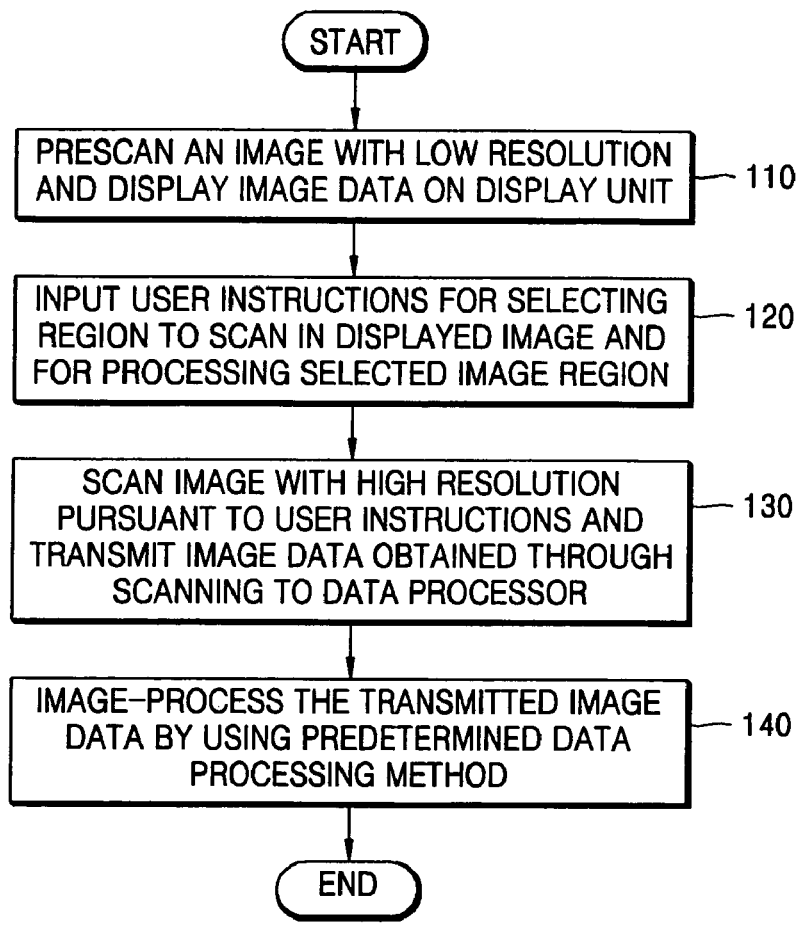
FIG. 1 is a flowchart illustrating a conventional method for processing data provided by a data supplying apparatus in a predetermined manner.
Figure 2:
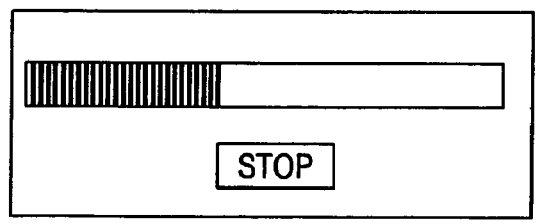
FIG. 2 is a diagram illustrating a conventional progress bar representing a progress state of a data process in the method for processing data illustrated in FIG. 1.
Figure 3:
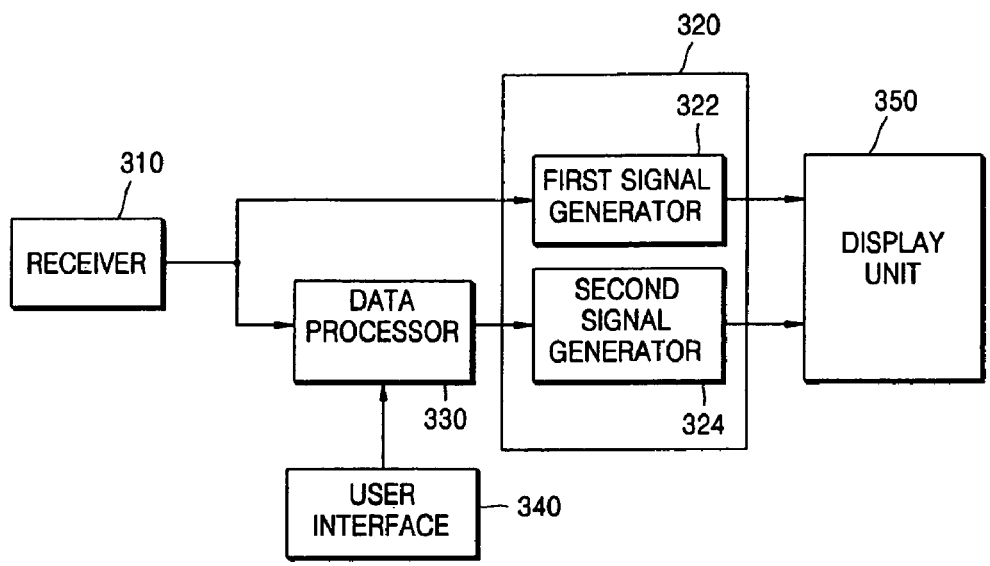
FIG. 3 is a block diagram of a host computer for displaying a plurality of progress states of data process according to an exemplary embodiment of the present invention.

FIG. 3 is a block diagram illustrating a host computer for displaying a plurality of progress states of data process according to an exemplary embodiment of the present invention. Referring to FIG. 3, the host computer comprises a receiver 310, a signal generator 320, a data processor 330, a user interface 340, and a display unit 350. The signal generator 320 comprises a first signal generator 322 and a second signal generator 324.

The receiver 310 comprises an interface (not shown) for receiving image data scanned and transmitted through a data supplying apparatus (not shown) such as, for example, a scanner. The first signal generator 322 of the signal generator 320 detects a state of reception process for the image data received from the receiver 310 to generate a first signal for representing a progress state of a reception process of the image data. In the meantime, the second signal generator 324 detects a progress state of processing the received image data at the data processor 330 by using a predetermined image data processing method and generates a second signal for representing a progress state of the image data processing. The display unit 350 displays progress bars which represent a progress state of receiving the image data and a progress state of processing the received image data, respectively.

Figure 4:
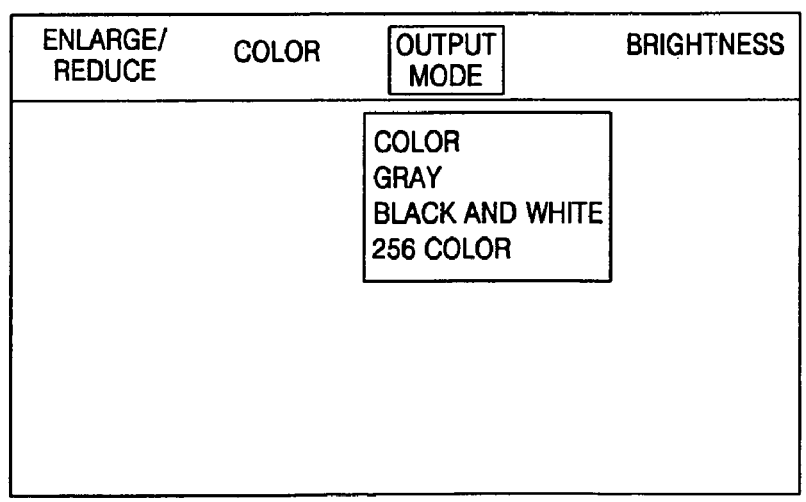
FIG. 4 is a diagram illustrating a user interface for inputting user instructions to select a data processing method in the host computer illustrated in FIG. 3.

A user inputs instructions through the user interface 340 for selecting image data processing method at the data processor 330. The received image data uses a predetermined image data processing method. FIG. 4 is a diagram illustrating a user interface for inputting user instructions to select a data processing method in the host computer illustrated in FIG. 3.

A user pre-scans an image to scan with a low resolution by using a scanner (not shown) and selects an image region to scan in the image scanned with the low resolution. The selected image region is scanned with a high resolution by the scanner and transmitted to the host computer. After that, the user can input instructions for selecting a data processing method to enlarge or reduce the selected image region, or input instructions for selecting a data processing method to change color of the selected image region. Further, the user can input instructions for selecting a data processing method to control an output mode, brightness, or a scan resolution of the selection image region. The data processor 330 processes the received image data according to the data processing method selected through the user interface 340.

Figure 5:
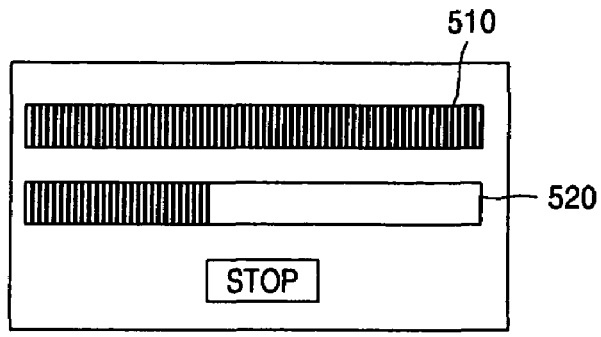
FIG. 5 is a diagram illustrating a plurality of progress bars representing a plurality of progress states of data process in the host computer illustrated in FIG. 3.

FIG. 5 is a diagram illustrating a plurality of progress bars for representing a plurality of progress states of data processing in the host computer illustrated in FIG. 3. A first progress bar 510 represents a progress state of scanning and transmission for the image data transmitted from the scanner, and a second progress bar 520 represents a progress state of processing the transmitted image data at the data processor 324 according to the data processing method selected through the user interface 330. Referring to FIG. 5, though only two progress bars for representing progress states of data processing are provided, the number of progress bars may vary depending on an application field of the present invention, which also falls within the scope of the present invention.

Figure 6:
FIG. 6 is a diagram illustrating various methods for displaying a plurality of progress states of data process that can be performed in the host computer illustrated in FIG. 3.
Figure 6:
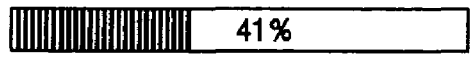

FIG. 6 is a diagram illustrating a plurality of methods for displaying a plurality of progress states of data processing that can be performed in the host computer illustrated in FIG. 3.

For example, the method for displaying progress states of data processing can display a progress state of receiving the image data and a progress state of processing the image data, respectively, by using progress bars arranged in parallel with each other as illustrated in FIG. 5.

In the meantime, referring to FIG. 6A, a progress state of scanning and transmission for the image data and a progress state of processing the image data can be displayed by using an image data scanning and transmission progress percentage and an image data processing progress percentage, respectively.

Further, referring to FIG. 6B, a progress state of scanning and transmission for the image data and a progress state of processing the image data can be displayed by using an elapsed time for scanning and transmitting the image data and a currently remaining time, and an elapsed time for completion of processing the image data and a currently remaining time, respectively.

Still further, referring to FIG. 6C, a progress state of scanning and transmission for the image data and a progress state of processing the image data can be displayed by using progress bars arranged in parallel with each other and image data processing progress percentages.

The plurality of methods for displaying the progress states of processing data illustrated in FIG. 6 are exemplary and the progress states of data processing may be displayed by using any suitable displaying methods, which also fall within the scope of the present invention.

Figure 7:
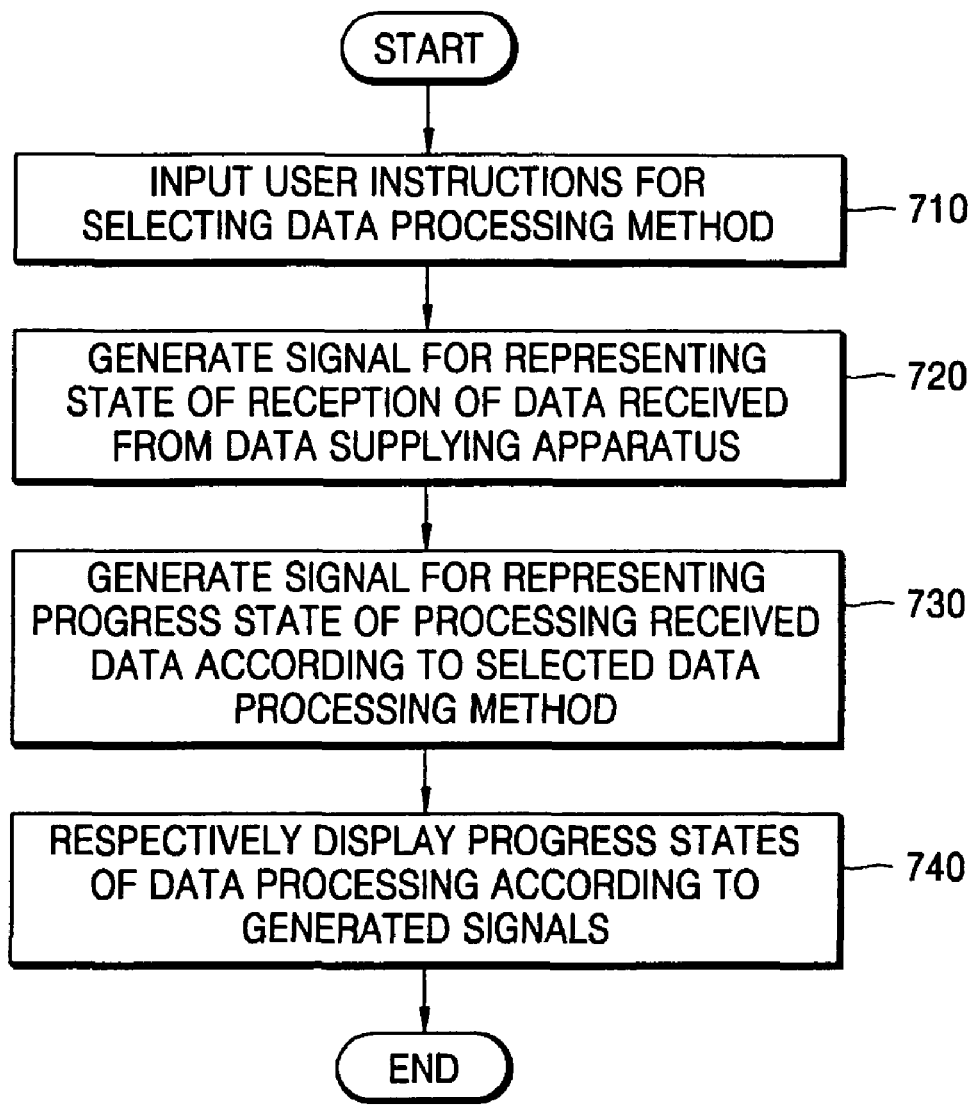
FIG. 7 is a flowchart illustrating a method for displaying a progress state of data process according to an exemplary embodiment of the present invention.

FIG. 7 is a flowchart of a method for displaying a progress state of data processing according to an exemplary embodiment of the present invention. A user prescans an image to scan with a low resolution by using a scanner and the display unit displays the scanned image with the low resolution. After that, a user inputs user instructions through the user interface for selecting an image region to scan in the displayed image and an image processing method for processing the selected image region at step 710. If the user instructions are input, the scanner rescans the image according to the user instructions to obtain image data and transmits the obtained image data to the receiver. The first signal generator detects the scanning and the transmission progress state of the image data at the receiver and generates the first signal for representing the scanning and the transmission progress states for the image data at step 720. In addition, the second signal generator detects the progress state of processing the image data at the data processor and generates the second signal for representing the progress state of processing the image data at step 730. The display unit displays the scanning and transmission progress state of the image data and the progress state of the processing the image data through a predetermined displaying method by using the generated first and the second signals at step 740.

When receiving image data from the data supplying apparatus such as a scanner or a digital camera and performing an image processing by using a predetermined image processing method, the displaying method and the host computer for realizing the method according to the present invention display a progress state of the image data reception and a progress state of the image data processing by using a plurality of progress bars, respectively, so that a user may easily check the progress state of the reception of the image data and the progress state of the image processing of the image data.

The exemplary embodiments of the present invention may be written as computer programs and may be implemented in computers that execute the programs by using a computer readable recording medium. Examples of the computer readable recording medium comprises magnetic storage media such as, for example, ROM, floppy disks, hard disks and the like, optical recording media such as, for example, CD-ROMs, DVDs and the like, and other storage media such as carrier waves, in other words, transmission through the Internet.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for displaying progress states of generating and processing scanned data when a data supplying apparatus generates the scanned data and transmits the generated data to a host computer, and the host computer receives the generated data and processes the received data, wherein the data supplying apparatus and the host computer are connected to each other, the method comprising:
    generating a first signal for indicating a first progress state of scanning an image, generating the scanned data, and transmitting a scanned image data to the host computer, wherein the data supplying apparatus performs the generating;
    displaying the first progress state on a screen of the host computer according to the generated first signal;
    generating a second signal for indicating a second progress state of receiving the scanned image data from the data supplying apparatus and processing the scanned image data according to a predetermined data processing method, wherein the host computer performs the generating; and
    displaying the second progress state on the screen of the host computer according to the generated second signal;
    wherein the predetermined data processing method is determined by a user's selection through a user interface provided by the host computer;
    wherein the first signal is generated before the second signal is generated;
    wherein the first progress state represents how much of the scanned image data was generated and transmitted;
    wherein the second progress state represents how much of the scanned image data was processed according to the predetermined data processing method; and
    wherein the first progress state and the progress state are displayed together on the screen of the host computer.

2. The method as claimed in claim 1, wherein the first or the second signals are displayed by at least one of a progress bar, a percentage, or a data processing time.

3. The method as claimed in claim 1, further comprising:
    inputting user instructions for selecting the method for processing the data.

4. A host computer for processing predetermined data provided from a data supplying apparatus, the host computer comprising:
    a first signal generator for generating a first signal for indicating a first progress state that represents how much scanned image data from a scanned image was generated and transmitted;
    a data processor for processing the scanned image data by using a predetermined image data processing method selected by a user via a user interface provided by the host computer;
    a second signal generator for generating a second signal for indicating a second progress state that represents how much of the scanned image data was processed by the host computer; and
    a display unit for displaying a subdivided progress state according to the generated first and second signals;
    wherein the first signal is generated before the second signal is generated; wherein the second signal represents how much of the scanned image data was processed according to the predetermined data processing method;
    wherein the second signal is generated after the scanned image data is received by the host computer from the data supplying apparatus, and represents how much of the scanned image data was processed by the host computer according to the predetermined data processing method; and
    wherein the display unit displays the two subdivided progress states together on a screen according to the first and second signals, respectively.

5. The host computer as claimed in claim 4, wherein the first or the second signals are displayed by at least one of a progress bar, a percentage, or a data processing time.

6. The host computer as claimed in claim 4, wherein the user interface is for inputting user instructions for selecting the method for processing the data.

7. A system comprising:
    a scanner for scanning an image and transmitting a scanned image data; and a host computer for receiving the scanned image data transmitted from the scanner and processing the received data by using a predetermined data processing method selected by a user via a user interface, and displaying a subdivided progress state of receiving the scanned image data and processing the scanned image data; a display unit; and
    wherein the subdivided progress state represents how much of the scanned image data was processed according to the predetermined data processing method;
    wherein the host computer comprises:
    a first signal generator for generating a first signal for indicating a first progress state that represents how much scanned image data was generated and transmitted;
    a data processor for processing the scanned image data by using the predetermined image data processing method; and
    a second signal generator for generating a second signal for indicating a second progress state that represents how much of the scanned image data was processed by the host computer;
    wherein the first signal is generated before the second signal is generated; wherein the display unit displays the subdivided progress state according to the generated first and second signals;
    wherein the second signal is generated after the scanned image data is received by the host computer from the scanner; and wherein the display unit displays the first and second signals, respectively.

8. The system as claimed in claim 7, wherein the display unit displays the first and the second signals, respectively.

9. The system as claimed in claim 8, wherein the first or the second signal is displayed by at least one of a progress bar, a percentage, or a data processing time.

10. The system as claimed in claim 7, wherein the user interface is for inputting user instructions for selecting a method for processing the image data.

* * * * *